(12) United States Patent
Tsai et al.

(10) Patent No.: US 7,434,972 B2
(45) Date of Patent: Oct. 14, 2008

(54) REFLECTION MODULE OF A LAMP OF MOTOR VEHICLE

(75) Inventors: Chang-Hsien Tsai, Tainan (TW); I-Chang Chen, Guantian Township, Tainan County (TW)

(73) Assignee: De Bao Technology Ltd., Tainan (TW)

( * ) Notice: Subject to any disclaimer, the term of this patent is extended or adjusted under 35 U.S.C. 154(b) by 58 days.

(21) Appl. No.: 11/599,340

(22) Filed: Nov. 15, 2006

(65) Prior Publication Data

US 2008/0112178 A1    May 15, 2008

(51) Int. Cl.
*B60Q 1/04* (2006.01)
(52) U.S. Cl. .................. 362/539; 362/517; 362/545
(58) Field of Classification Search .................. 362/280, 362/281, 298, 319, 321, 346, 516, 517, 518, 362/519, 526, 531, 532, 538, 539, 545
See application file for complete search history.

(56) References Cited

U.S. PATENT DOCUMENTS 5,718,505 A * 2/1998 Daumueller et al. ........ 362/319

| | | | |
|---|---|---|---|
| 6,454,448 B2 * | 9/2002 | Taniuchi et al. | 362/539 |
| 6,953,272 B2 * | 10/2005 | Hayakawa et al. | 362/517 |
| 7,350,948 B2 * | 4/2008 | Nino et al. | 362/539 |

\* cited by examiner

*Primary Examiner*—Y My Quach Lee
(74) *Attorney, Agent, or Firm*—Rosenberg, Klein & Lee

(57) ABSTRACT

A reflection module of a car lamp includes a shell, and a reflection mechanism in the shell; the reflection module includes a main part, a first reflection portion sticking from the main part, a separating plate connected to an upper edge of the first reflection portion, a second reflection portion sticking upwards from an edge of the separating plate, and a blocking plate positioned on the separating plate in an adjustable manner; each of the separating plate and the blocking plate has a slot thereon, and the slots together define a light passage; therefore, the width of the light passage can be adjusted such that light from a shining element will be reflected outside from the reflection module with an upper edge of the light beams being in a horizontal direction to define an imaginary horizontal line called the cut-off, and light from the lamp won't be dazzling.

14 Claims, 13 Drawing Sheets

REFLECTION MODULE OF A LAMP OF MOTOR VEHICLE

BACKGROUND OF THE INVENTION

1. Field of the Invention

The present invention relates to a reflection module of a lamp of a motor vehicle, more particularly one, which can be adjusted in the width of a light passage thereon such that light from a shining element (light source) of the lamp will be reflected outside from the reflection module with an upper edge thereof being in a horizontal direction to define an imaginary horizontal line called the cut-off.

2. Brief Description of the Prior Art

Early motor vehicle lamps are usually equipped with tungsten bulbs, which are being gradually replaced with LED (light emitting diodes). And, HID (high intensity discharge) lamps are getting more popular currently, which will make vehicle lamps much brighter, thus allowing the drivers to see clearly as well as making other people notice easily in the dark and dense fog.

Light from a vehicle lamp will be very dazzling, and prone to cause accidents if the light beams travel in a direction at an angle above the horizontal direction.

Therefore, the government regulation stipulates that light beams from all car lamps be directed in a direction either parallel to or at an angle below an imaginary horizontal line, which is called the cut-off.

Referring to FIG. 1, a currently existing reflection module 7 of a lamp of a motor vehicle has a cut-off, and can prevent light of the lamp from becoming dazzling. The reflection module 7 has a light blocking plate 72, and curved shade 73. The curved shade 73 is positioned around the light source 71, and has a reflection side 731. The light blocking plate 72 is positioned lower than a light source 71 of the lamp for blocking an upper portion of light reflected from the reflection side 731 of the curved shade 73; thus only a lower portion of light reflected from the reflection side 731 of the curved shade 73 will travel outside, and an upper edge of the light beams emitted from the lamp will be in a horizontal direction, which defines an imaginary horizontal line called the cut-off.

Referring to FIGS. 2 and 3, a second currently existing reflection module 8 of a lamp of a motor vehicle includes a semispherical first reflection side 81, and a second reflection side 82. The second reflection side 82 is parabola-shaped, and disposed under and connected to a lower end of the first reflection side 81 with a gate existing between the first and the second reflection sides 81 and 82. And, a light source 84 is disposed in front of the semispherical first reflection side 81. Light emitted from the light source 84 will be reflected by the first reflection side 81, and only those portions of the light that are at certain angles of reflection will travel to the second reflection side 82 through the gate 83. And, such light will be reflected to travel outside in a horizontal direction by means of the second reflection side 82.

However, the above-mentioned reflection modules of motor vehicle lamps have a common disadvantage: they are suitable for use with only a certain kind of light sources. Different kinds of light sources, e.g. Tungsten bulbs, HID lamps, and light emitting diodes, emit light beams with different angles of spread. Therefore, the manufacturers have to manufacture several different reflection modules to be suitable for different kinds of light sources, which reflection modules can be different in their light blocking plates or the width of their gates provided for light to travel through. Consequently, the total manufacturing cost will be significantly increased. And, after the light sources have been replaced with a different kind of lamps, the reflection modules will also have to be changed, incurring more expense on the consumers. Therefore, such reflection modules aren't economical to use.

SUMMARY OF THE INVENTION

It is a main object of the invention to provide an improvement on a reflection module of a lamp of a motor vehicle to overcome the above-mentioned problems. The reflection module includes a lamp shell, and a reflection mechanism in the lamp shell. The reflection module includes a main part, a first reflection portion sticking from the main part, a transverse separating plate connected to an upper edge of the first reflection portion, a second reflection portion sticking upwards from an edge of the transverse separating plate, and a blocking plate positioned on the transverse separating plate in an adjustable manner; each of the transverse separating plate and the blocking plate has a slot thereon, and the slots together define a light passage; therefore, the width of the light passage can be adjusted such that light from a shining element will be reflected from the second reflection portion to travel outside with an upper edge of the light beams being in a horizontal direction to define an imaginary horizontal line called the cut-off, and light from the lamp won't be dazzling.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
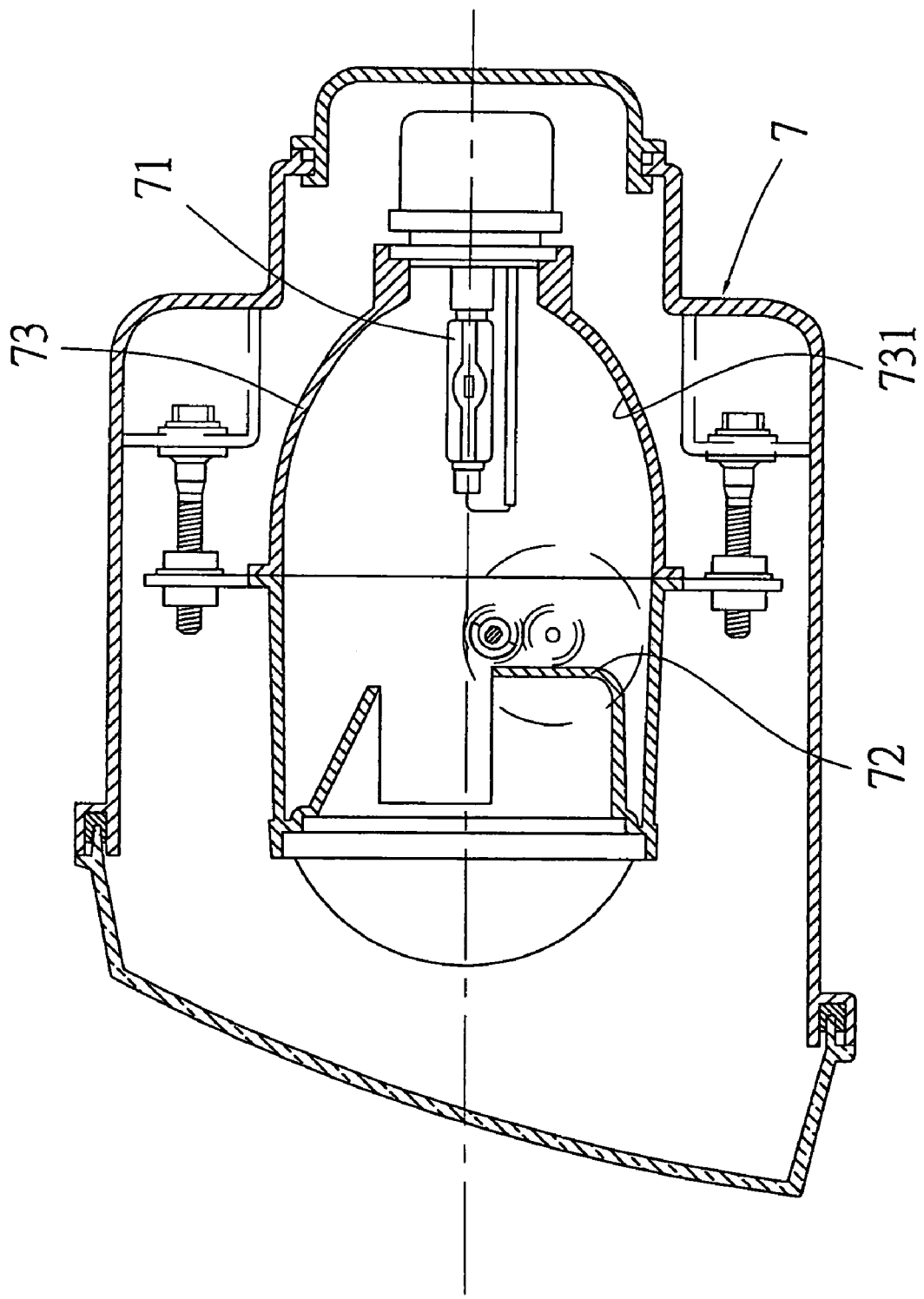
FIG. 1 is a sectional view of the first prior art.
Figure 2:
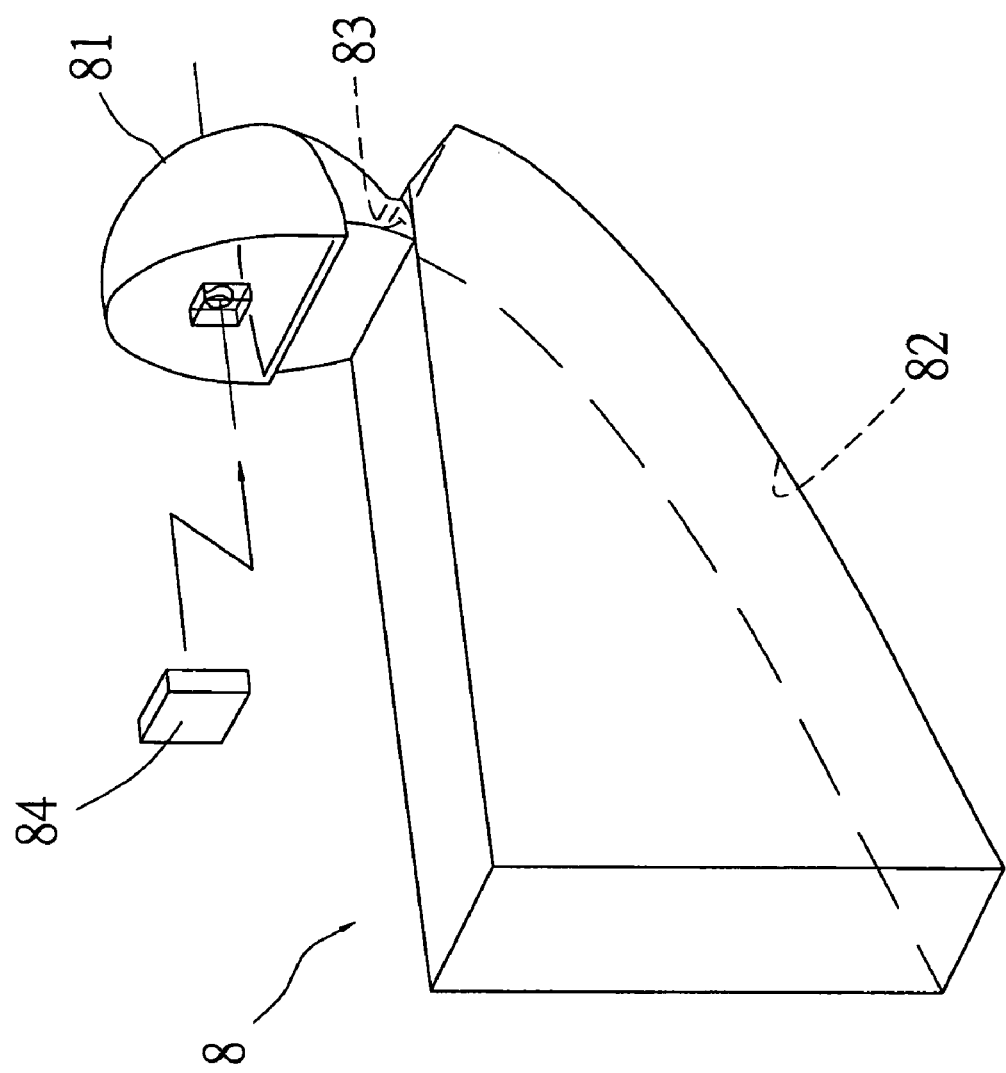
FIG. 2 is an exploded perspective view of the second prior art.
Figure 3:
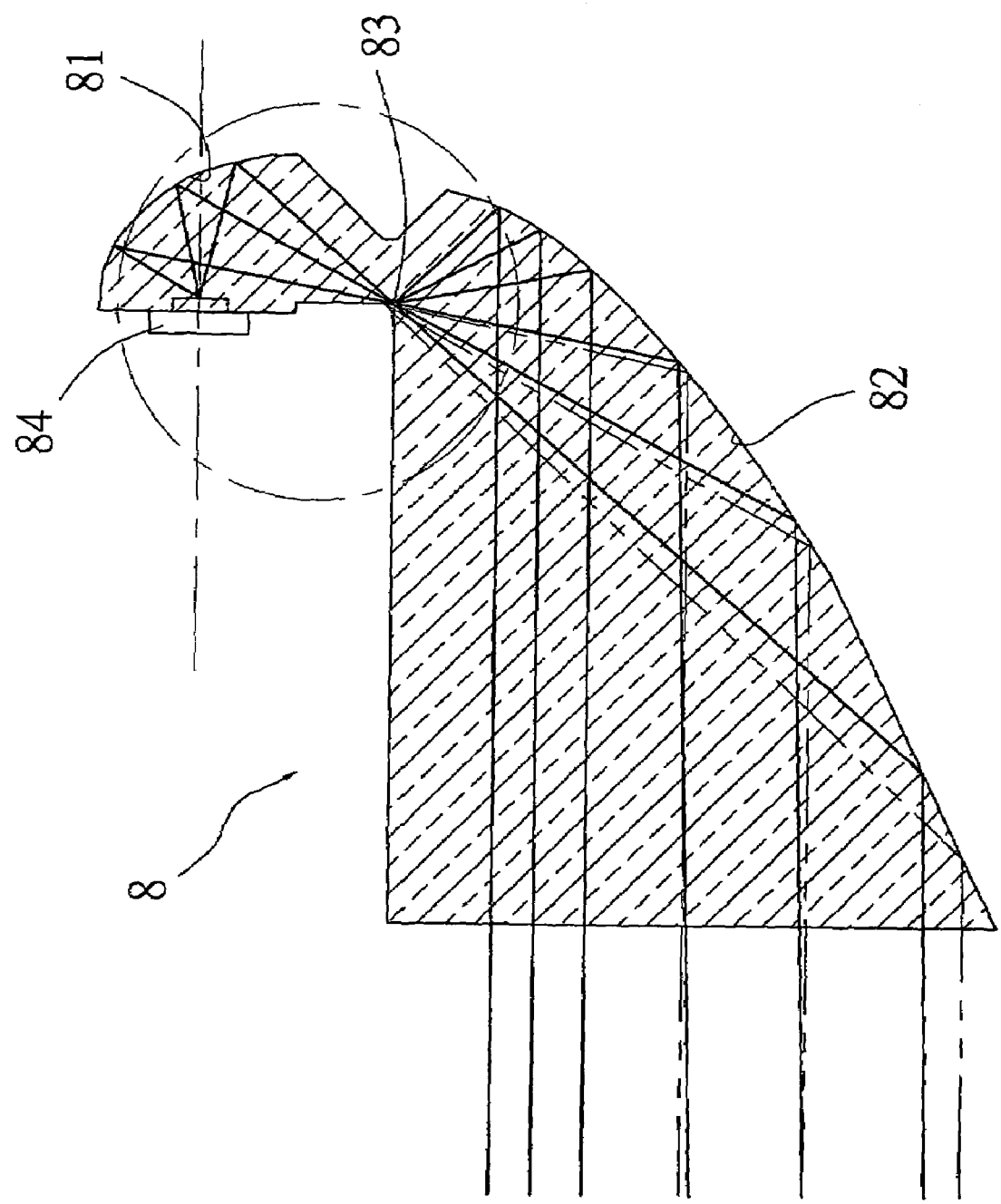
FIG. 3 is a view for demonstrating reflection of light by the second prior art.
Figure 4:
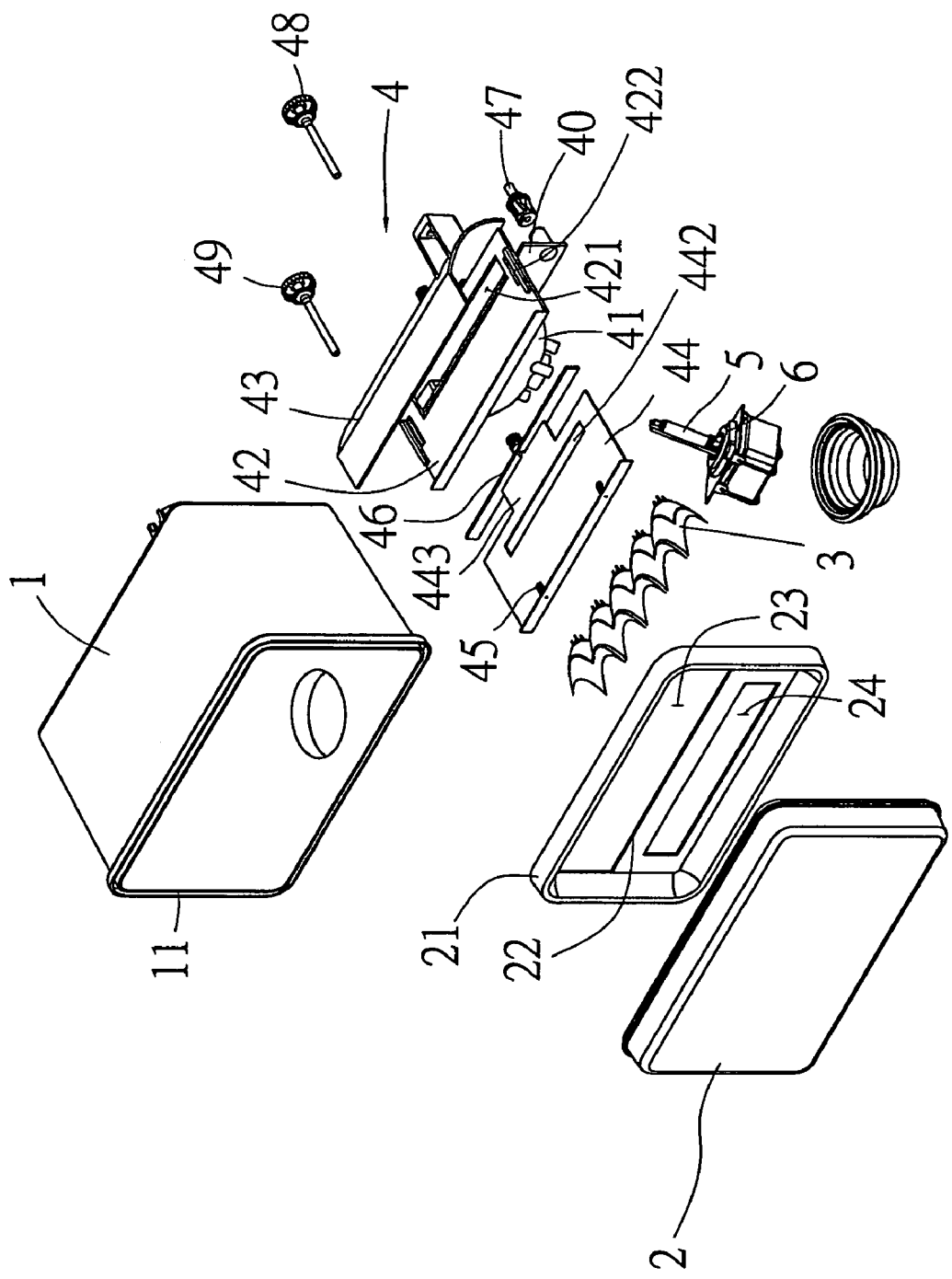
FIG. 4 is an exploded perspective view of the present invention.

Referring to FIG. 4, a preferred embodiment of a reflection module of a lamp of a motor vehicle includes a lamp shell 1, a lamp shade 2, a reflection mechanism 4, a shining member 5, and a connecting member 6.

Figure 5:
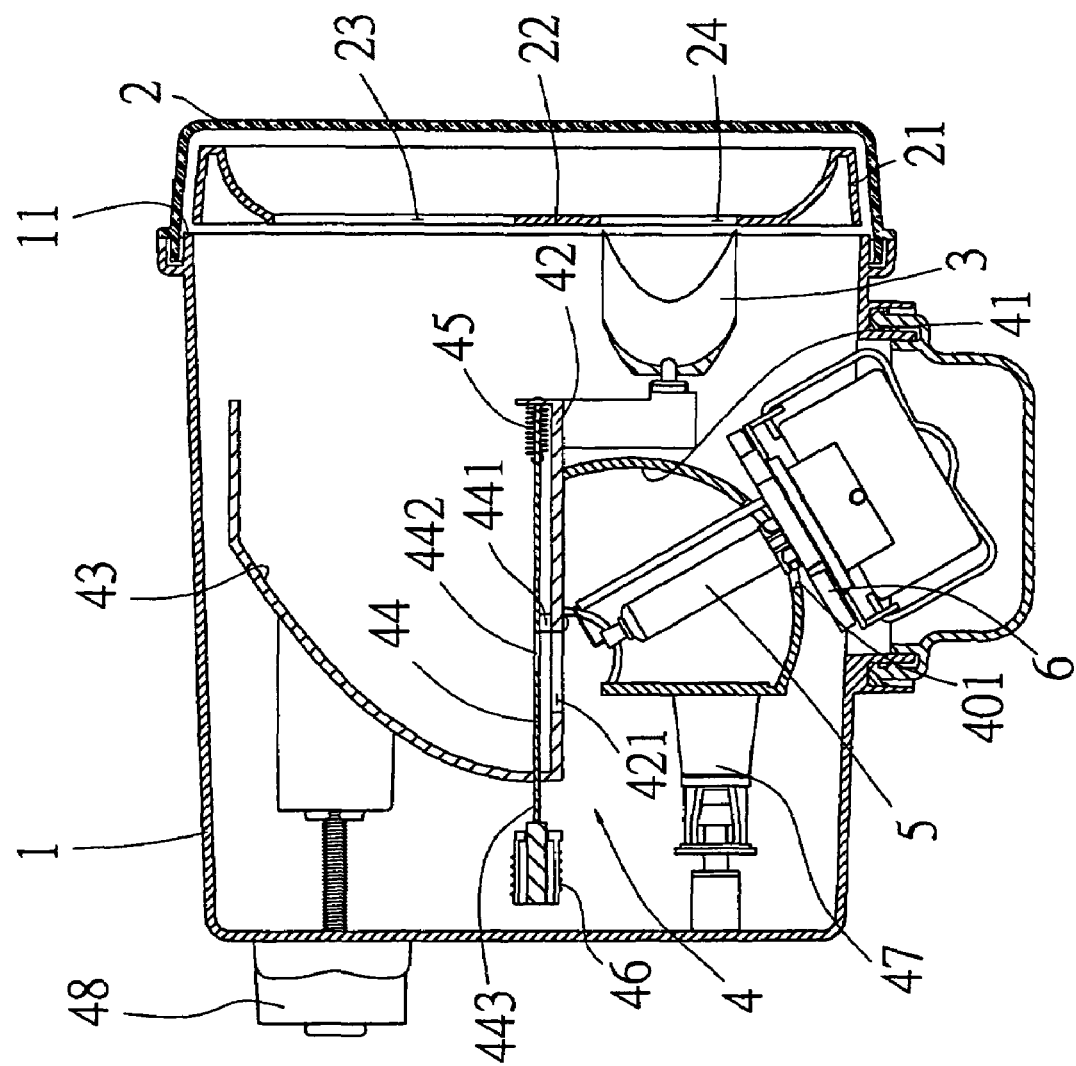
FIG. 5 is a vertical sectional view of the present invention.

The lamp shell 1 has an open end 11. The lamp shade 2 is fitted on the open end of the lamp shell 1, and includes a separating plate 21, and light blocking strip 22; the light blocking strip 22 is positioned on the separating plate 21 so that the separating plate 21 is divided into an upper hollow portion 23, and a lower hollow portion 24. Referring to FIG. 5, a light source 3 used for indicating direction is disposed in such a position as to face the lower hollow portion 24 of the separating plate 21.

Figure 6:
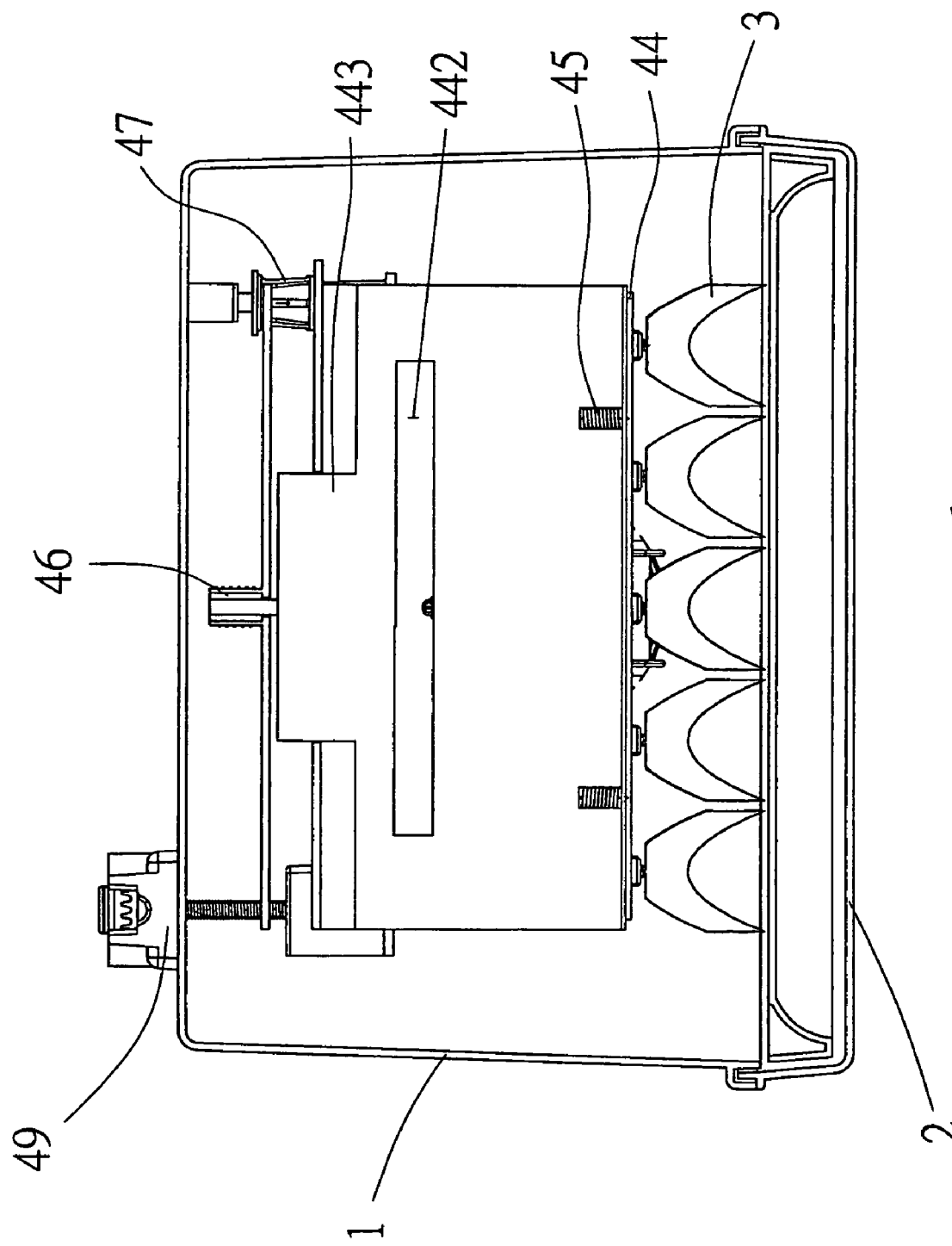
FIG. 6 is a horizontal sectional view of the present invention.

The reflection mechanism 4 is disposed in the lamp shell 1, and includes:

a main part 40, the main part 40 has a through hole 401, and several connecting holes 402 thereon;

an oval ball-shaped first reflection portion 41 attached to and extending from the main part 40, the through hole 401 of the main part 40 is formed on a portion of the main part 40 that is next to the first reflection portion 41;

a transverse separating plate 42 connected to an upper edge of the oval ball-shaped first reflection portion 41, the transverse separating plate 42 has a slot 421, and two guide slots 422 thereon;

a parabola-shaped second reflection portion 43 attached to and extending upwards from an edge of the transverse separating plate 42, a blocking plate 44, the blocking plate 44 has post-shaped parts 441 on a lower side thereof, an adjustment slot 442 thereon, and a sticking section 443; the blocking plate 44 is positioned on an upper side of the transverse separating plate 42 with the post shaped parts 441 being passed through the guide slots 422, with the adjustment slot 442 facing or overlapping the slot 421 facing or overlapping the slot 421 of the transverse separating plate 42, and with the sticking section 443 thereof extending beyond the edge of the main part 40;

several elastic elements 45, the elastic elements 45 are each connected to the blocking plate 44 at one end, and connected to the transverse separating plate 42 at the other end;

a drawing element 46 disposed near to the sticking section 443 of the blocking plate 44 for adjusting position of the blocking plate 44 in relation to the transverse separating plate 42; the drawing element 46 is an electromagnet;

a pivotal shaft 47, to which the main part 40 is connected;

a first adjustment element 48, the first adjustment element 48 is connected to the main part 40 such that an imaginary line connecting the first adjustment element 48 and the pivotal shaft 47 is vertical, and the reflection mechanism 4 can be pivoted upwards and downwards to adjust position by means of the first adjustment element 48, as shown in FIG. 5;

a second adjustable element 49, the second adjustment element 49 is connected to the main part 40 such that an imaginary line connecting the second adjustment element 49 and the pivotal shaft 47 is horizontal, and the reflection mechanism 4 can be pivoted leftwards and rightwards to adjust position by means of the second adjustment element 49, as shown in FIG. 6.

Therefore, the blocking plate 44 can be moved for adjustment in its position in relation to the transverse separating plate 42 with the help of the drawing element 46, thus adjusting the width of a light passage defined by both the blocking plate 44 and the transverse separating plate 42.

Figure 7:
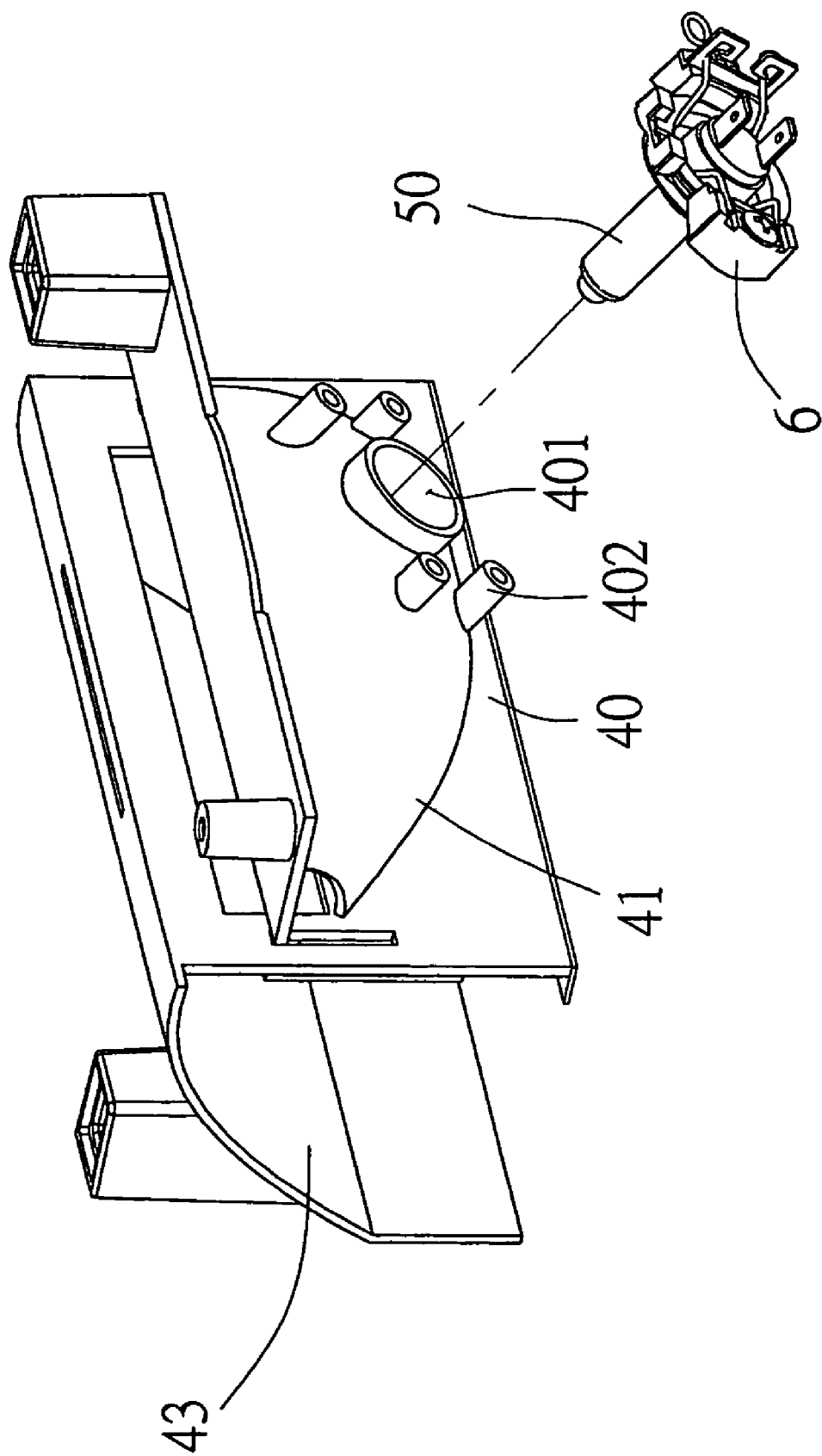
FIG. 7 is a fragmentary exploded perspective view of the present invention (1)
Figure 8:
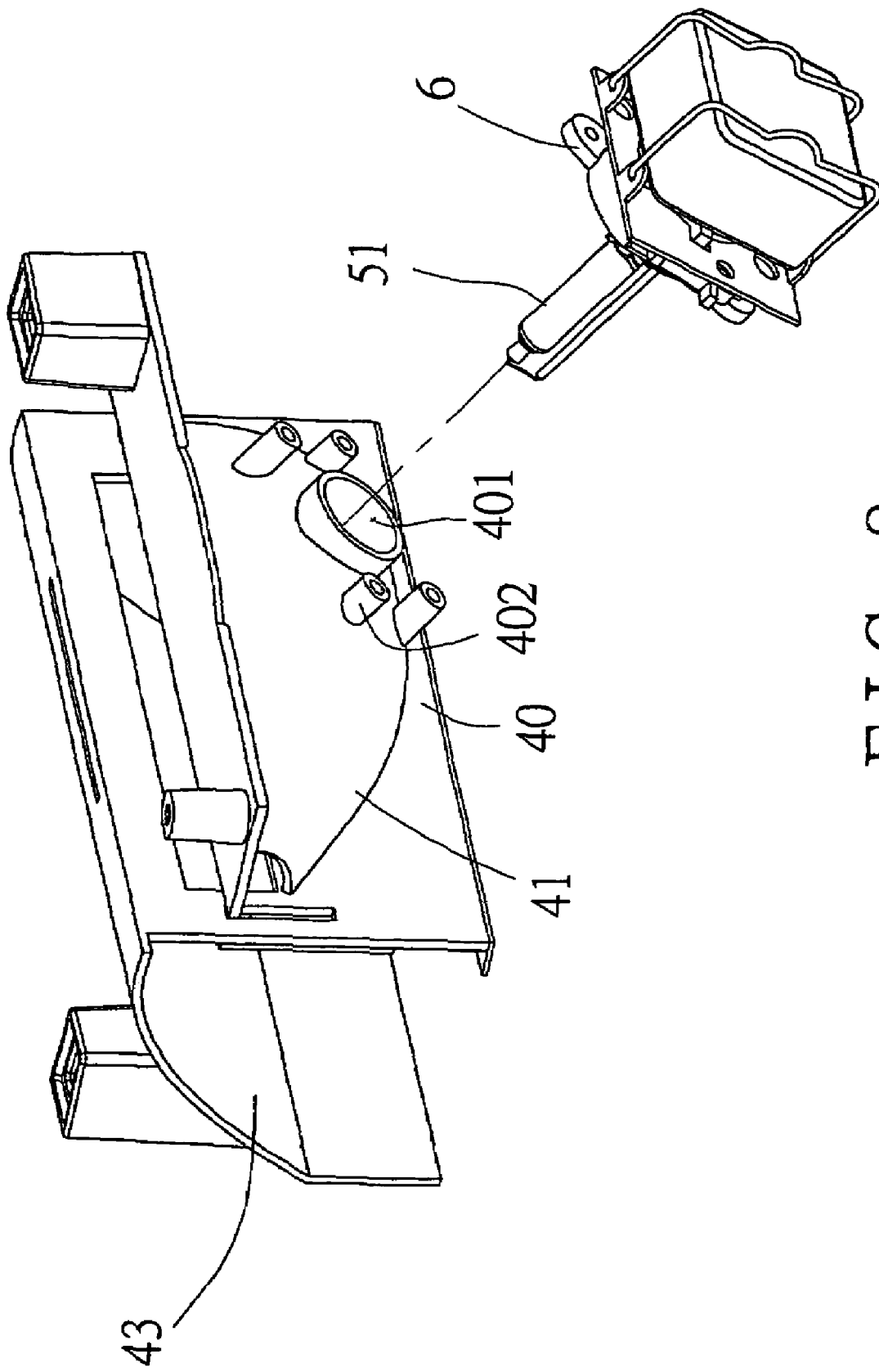
FIG. 8 is a fragmentary exploded perspective view of the present invention (2)
Figure 9:
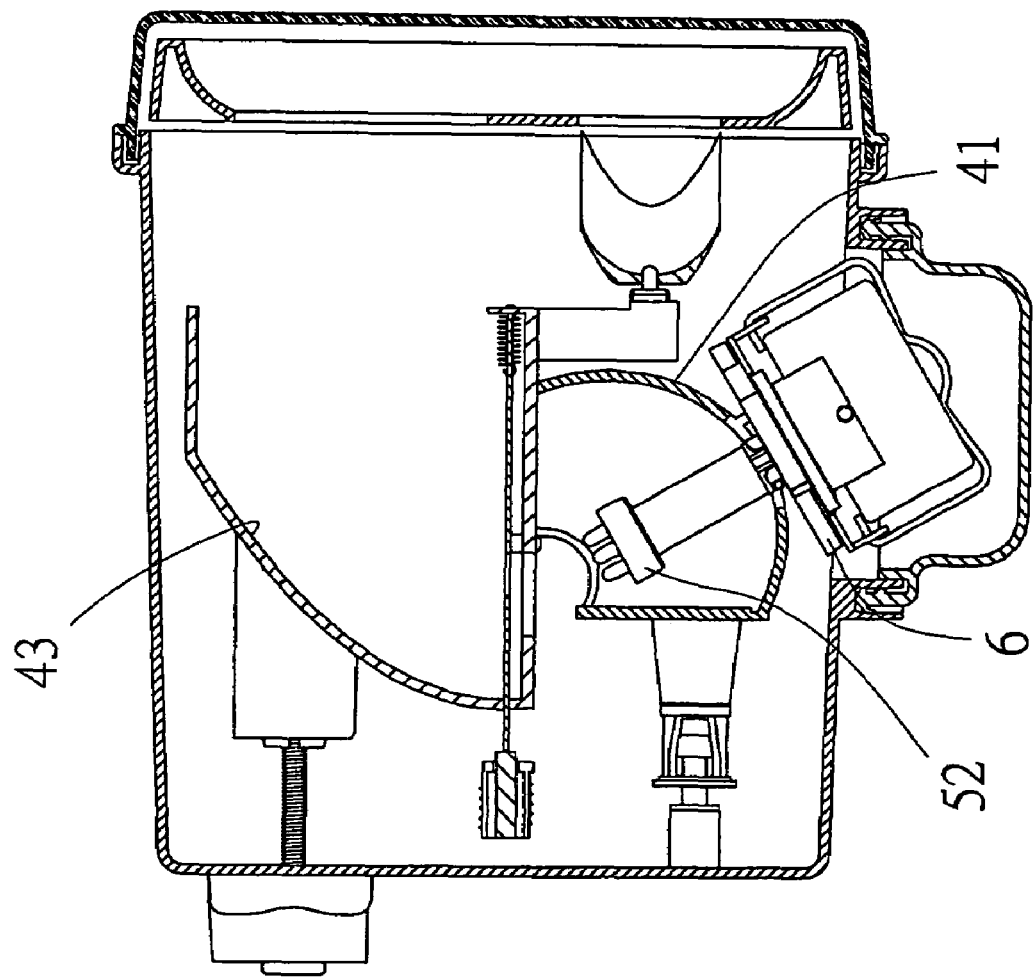
FIG. 9 is a sectional view of the present invention.
Figure 10:
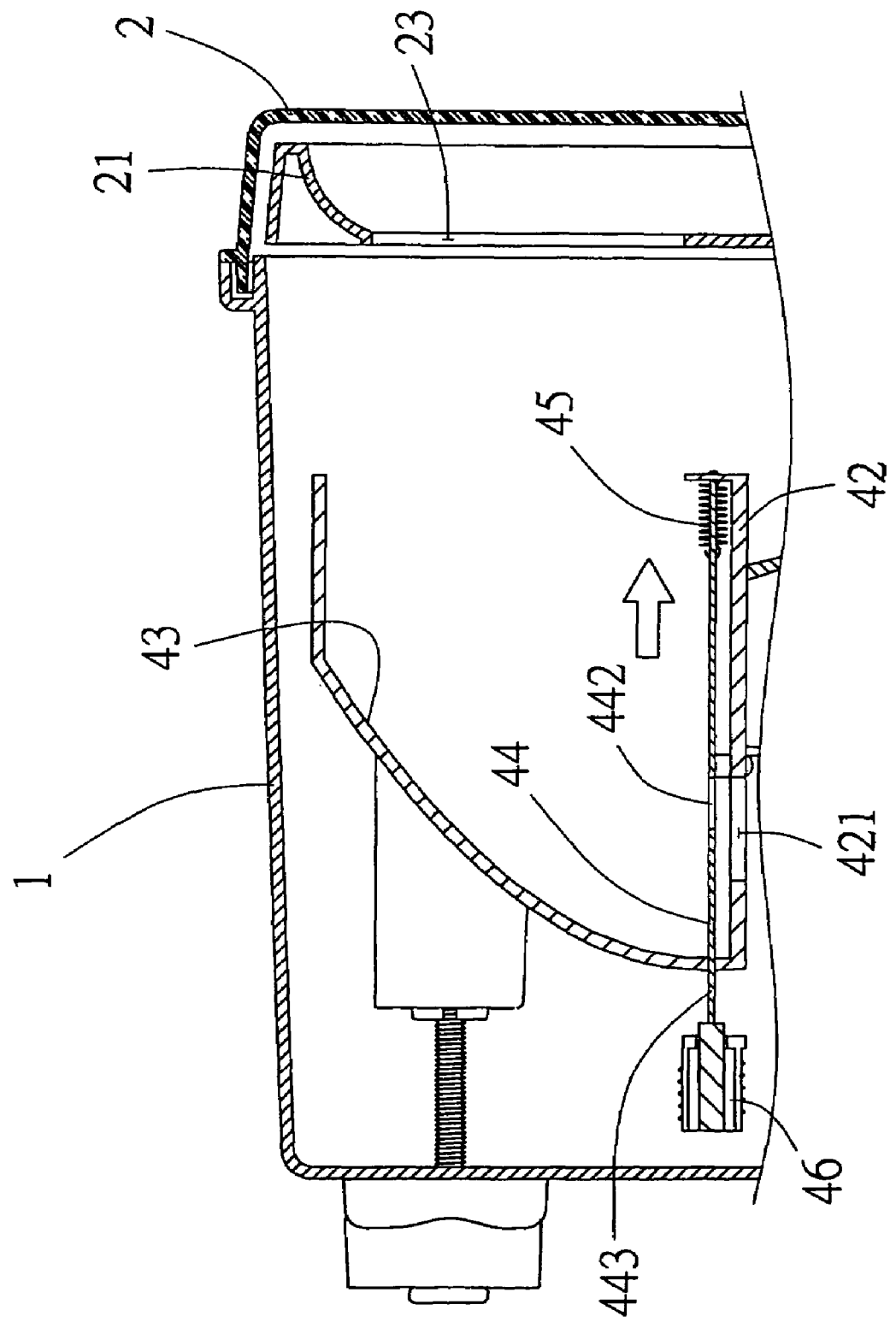
FIG. 10 is a view of the present invention in use (1)
Figure 11:
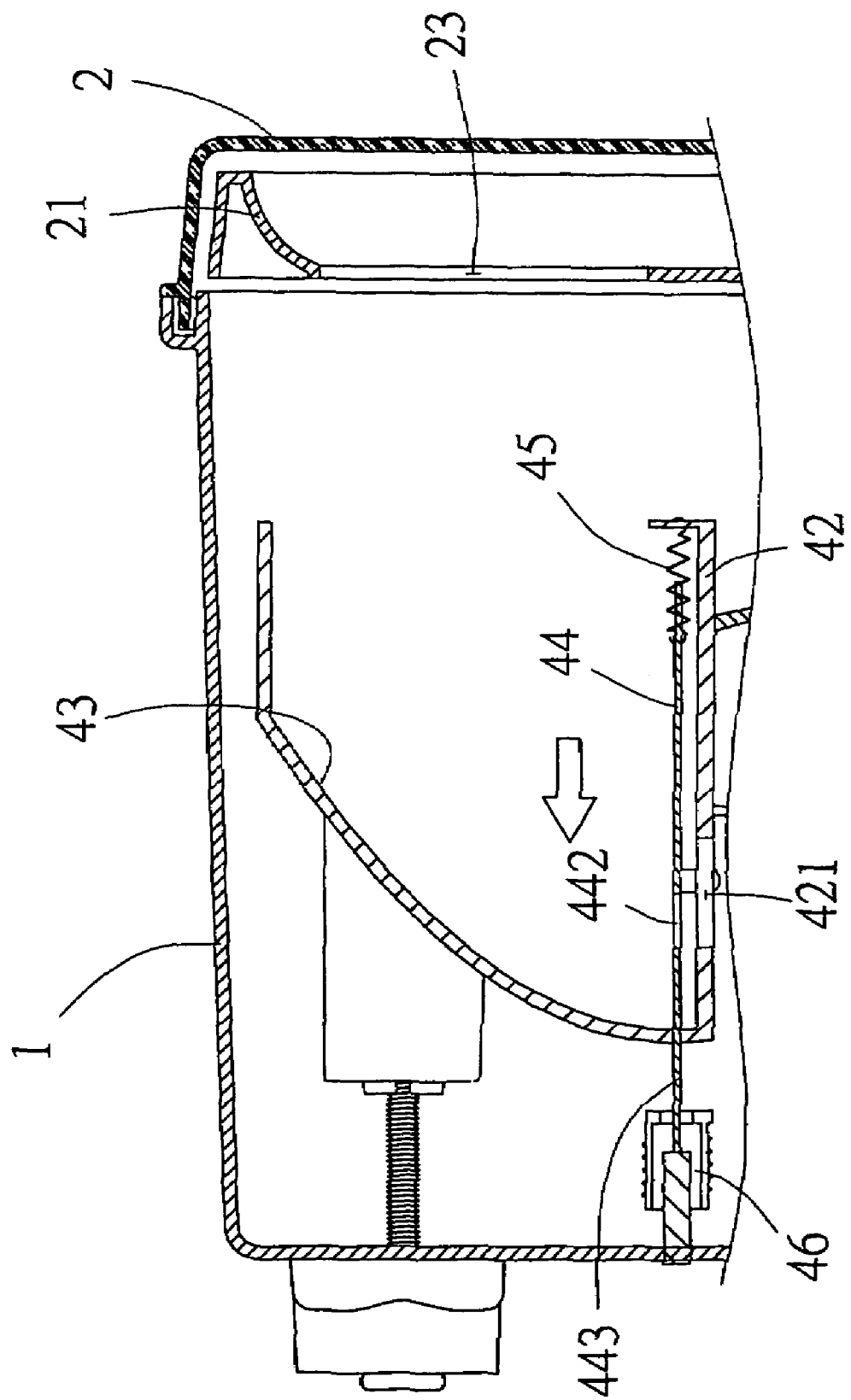
FIG. 11 is a view of the present invention in use (2)

The connecting member 6 and the main part 40 of the reflection mechanism 4 are joined together with the help of the connecting holes 402. And, the shining member 5 is passed through the through hole 401, and fitted on the connecting member 6; thus, the shining member 5 is held in position within the first reflection portion 41. The shining member 5 can be Tungsten bulbs (FIG. 7), HID (high intensity discharge) lamps (FIG. 8) or light emitting diodes (FIG. 9), and various kinds of connecting members 6 are provided to be suitable for respective ones of different kinds of shining members 5.

Therefore, when the shining member 5 is powered to shine, light from the shining member 5 will be reflected by the oval ball-shaped first reflection portion 41, and travel through the adjustment slot 442 of the blocking plate 44 as well as the slot 421 of the transverse separating plate 42 to the parabola-shaped second reflection portion 43, and it will be reflected by the parabola-shaped second reflection portion 43 such that horizontal beams are produced, and travel outside through the upper hollow portion 23 of the separating plate 21 of the lamp shade 2. After the shining member 5 has been replaced with a different kind of shining member, the user is allowed to adjust the light passage to a new width suitable for the new shining member, which light passage is defined by both the blocking plate 44 and the transverse separating plate 42, by means of displacing the blocking plate 44 relative to the transverse separating plate 42 such that an upper edge of the light beams from the lamp will be in a horizontal direction, which defines an imaginary horizontal line called the cut-off; thus, light from the lamp can't be dazzling. And, the lamp of the present invention can be adjusted so as to emit either a far-reaching beam or an ordinary illumination beam with the help of the drawing element 46. In addition, the lamp can be used as a searchlight after the blocking plate 44 has been adjusted for the adjustment slot 442 thereof and the slot 421 of the transverse separating plate 42 face each other without overlapping, thus allowing the maximum amount of light to travel from the first reflection portion 41 to the second reflection portion 43.

Figure 12:
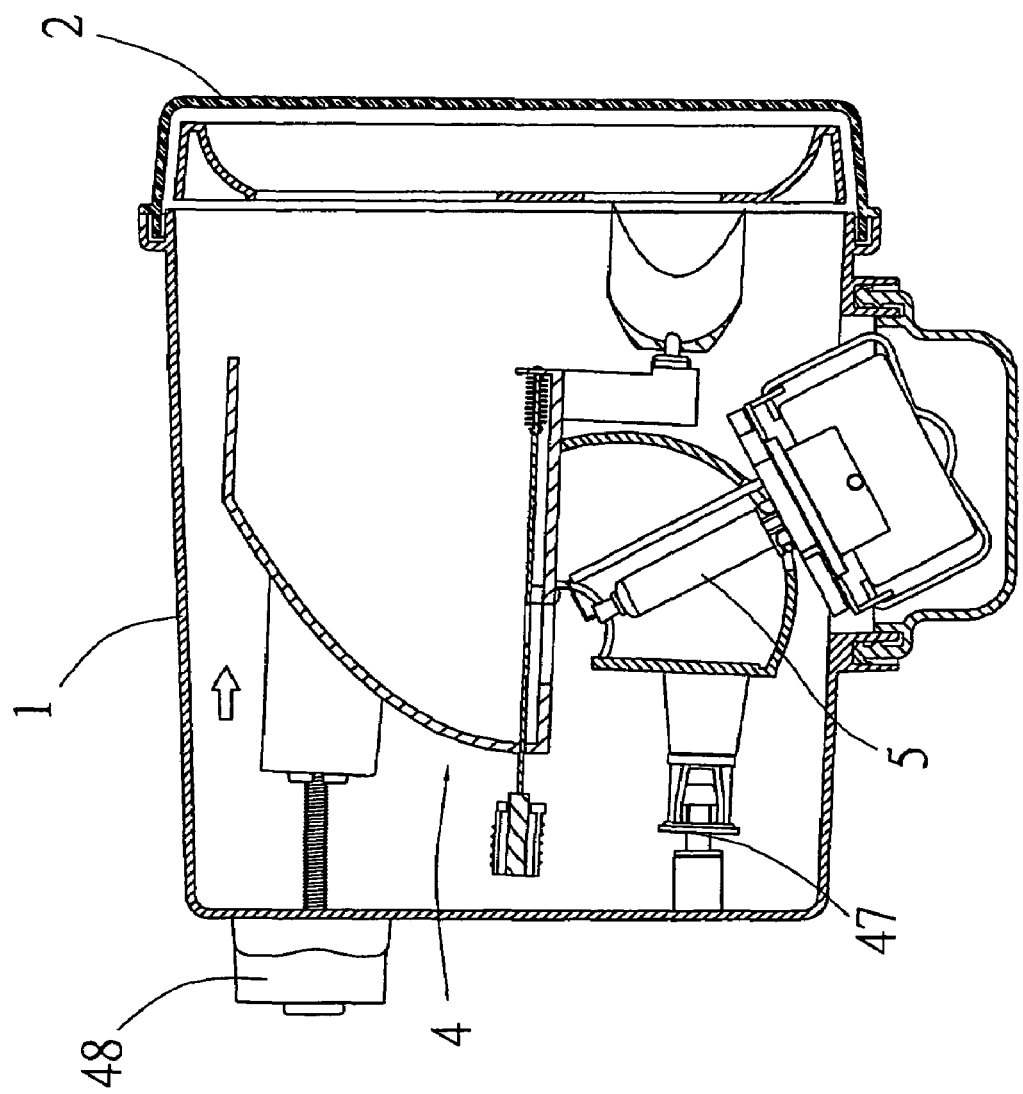
FIG. 12 is a view of the present invention in use (3)
Figure 13:
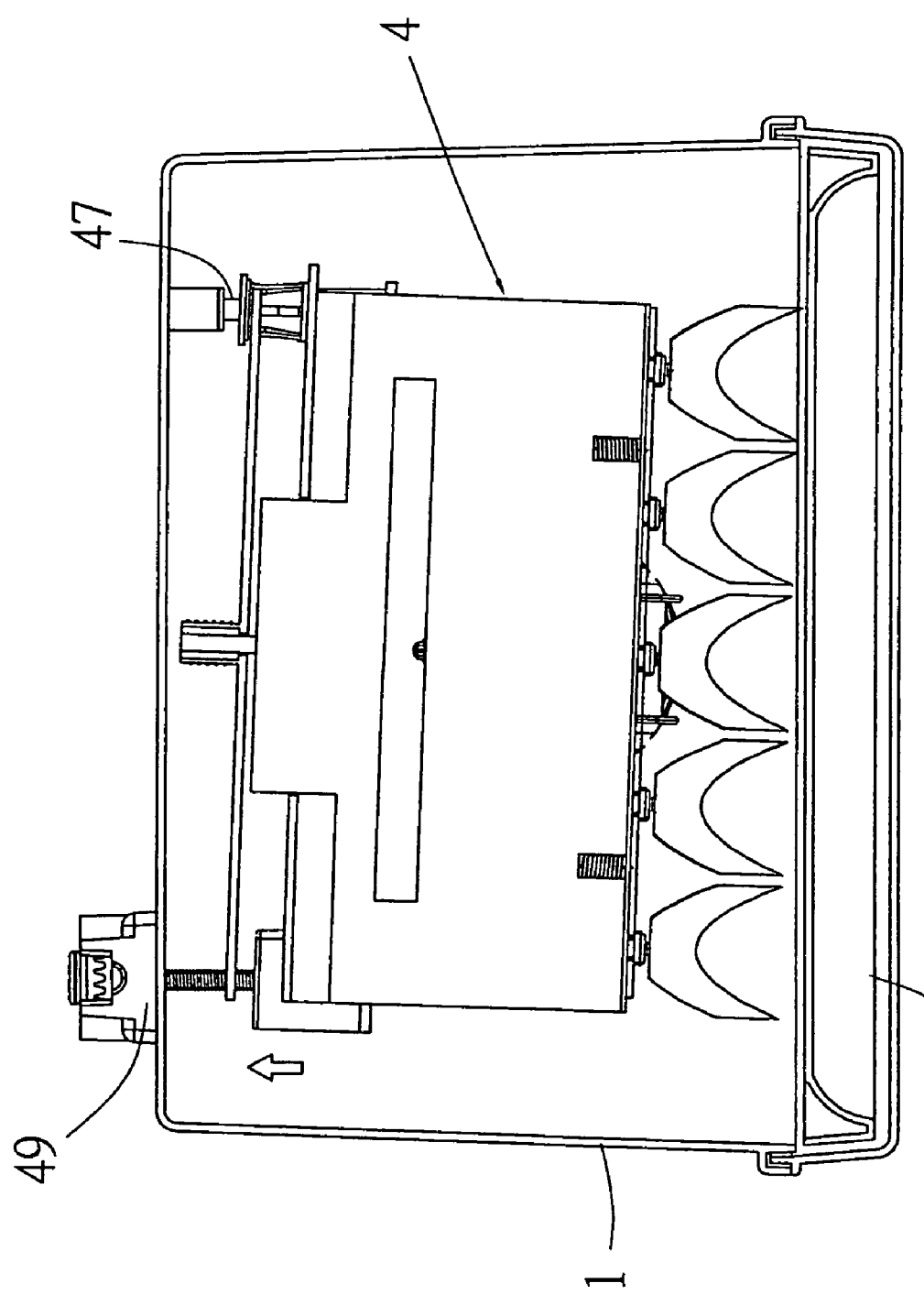
FIG. 13 is a view of the present invention in use (4).

Referring to FIG. 12, the reflection mechanism 4 is being pivoted up and down to change in orientation in relation to x-axis with the help of the first adjustment element 48. Referring to FIG. 13, the reflection mechanism 4 is being pivoted left and right to change in orientation in relation to the y-axis with the help of the second adjustment element 49. Thus, the orientation of the reflection mechanism 4 of the lamp is adjusted so that light beams are reflected from the reflection mechanism 4 in a new direction.

From the above description, it can be seen that the present invention has the following advantages:

1. The reflection module can be used with various kinds of shining members (light sources) therefore the manufacturers don't have to manufacture several different kinds reflection modules to be suitable for various light sources, thus capable of manufacturing reflection modules at a relatively low cost.

2. The users of the reflection module of the present invention are allowed to replace the original shining members (light sources) with their favorite ones without having to change the whole reflection module at the same time. Therefore, the reflection module is relatively economical to use.

3. It will cause relatively low impact on the environment to use the reflection modules of the present invention because the consumers are allowed to replace the original shining members (light sources) with their favorite ones without having to change the whole reflection module at the same time.

What is claimed is:

1. An improvement on a reflection module of a lamp of a motor vehicle, comprising
a lamp shell, and
a reflection mechanism positioned in the lamp shell, the reflection mechanism including:
(a) a main part,
(b) a first reflection portion attached to and extending from the main part,
(c) a transverse separating plate connected to an upper edge of the first reflection portion, the transverse separating plate having a slot therein;
(d) a second reflection portion attached to and extending upwards from an edge of the transverse separating plate, and
(e) a blocking plate positioned on an upper side of the transverse separating plate, the blocking plate having an adjustment slot therein, which faces the slot of the transverse separating plate.

2. The reflection module of a lamp of a motor vehicle as recited in claim 1, wherein the transverse separating plate has plural guide slots therein, and the blocking plate has plural post-shaped parts on a lower side thereof; the post-shaped parts being passed through the guide slots of the transverse separating plate.

3. The reflection module of a lamp of a motor vehicle as recited in claim 1, wherein the first reflection portion is oval ball-shaped.

4. The reflection module of a lamp of a motor vehicle as recited in claim 1, wherein the second reflection portion is parabola-shaped.

5. The reflection module of a lamp of a motor vehicle as recited in claim 1, wherein the main part of the reflection mechanism is connected to a pivotal shaft, a first adjustment element connected to the main part for pivoting the main part up and down, and a second adjustment element connected to the main part for pivoting the main part left and right; the first adjustment element being in such position that an imaginary line connecting the first adjustment element and the pivotal shaft is vertical; the second adjustment element being in such position that an imaginary line connecting the second adjustment element and the pivotal shaft is horizontal.

6. The reflection module of a lamp of a motor vehicle as recited in claim 1, wherein the main part of the reflection mechanism has a through hole formed in a portion thereof that is next to the first reflection portion, and a shining member is passed through the through hole.

7. The reflection module of a lamp of a motor vehicle as recited in claim 6, wherein the main part of the reflection mechanism has a plurality of connecting holes thereon, and a connecting member, which is provided to hold the shining member, is fitted to the main part with help of the connecting holes.

8. The reflection module of a lamp of a motor vehicle as recited in claim 6, wherein the shining member is a HID (high intensity discharge) lamp.

9. The reflection module of a lamp of a motor vehicle as recited in claim 6, wherein the shining member includes light emitting diodes.

10. The reflection module of a lamp of a motor vehicle as recited in claim 6, wherein the shining member is a Tungsten bulb.

11. The reflection module of a lamp of a motor vehicle as recited in claim 1 further having a drawing element, and a plurality of elastic elements, which are disposed between and connected to the blocking plate and the transverse separating plate; the blocking plate having a sticking section near to the drawing element.

12. The reflection module of a lamp of a motor vehicle as recited in claim 11, wherein the drawing element is an electromagnet.

13. The reflection module of a lamp of a motor vehicle as recited in claim 1, wherein the lamp shell has an open end, on which a lamp shade is fitted; the lamp shade including a separating plate, and light blocking strip, which is positioned in the separating plate so that the separating plate is divided into an upper hollow portion, and a lower hollow portion.

14. The reflection module of a lamp of a motor vehicle as recited in claim 13, wherein a light source used for indicating direction is disposed in a position facing the lower hollow portion of the separating plate of the lamp shade.

\* \* \* \* \*